United States Patent
Schnalzger et al.

(10) Patent No.: US 6,250,725 B1
(45) Date of Patent: Jun. 26, 2001

(54) BARRIER VALVE WITH PRESSURE LIMITING FUNCTION IN PARTICULAR FOR SLIP-CONTROLLED HYDRAULIC BRAKE SYSTEMS OF MOTOR VEHICLES

(75) Inventors: Guenther Schnalzger, Blaichach; Peter Zimmermann, Sonthofen-Altstaedten; Robert Mueller, Blaichach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,979

(22) PCT Filed: Dec. 17, 1998

(86) PCT No.: PCT/DE98/03713

§ 371 Date: Nov. 9, 2000

§ 102(e) Date: Nov. 9, 2000

(87) PCT Pub. No.: WO99/52757

PCT Pub. Date: Oct. 21, 1999

(30) Foreign Application Priority Data

Apr. 8, 1998 (DE) .............................. 198 15 778

(51) Int. Cl.[7] .................... B60T 8/36; B60T 13/66
(52) U.S. Cl. ........................... 303/119.2; 303/901
(58) Field of Search ............... 303/119.2, 119.3, 303/113.1, 900, 901, 113.2, 113.3; 137/495, 509, 596.17; 251/129.01–129.22, 83

(56) References Cited

U.S. PATENT DOCUMENTS

| | | | |
|---|---|---|---|
| 5,167,442 | * 12/1992 | Alaza et al. | 303/113.2 |
| 5,203,617 | * 4/1993 | Wilde | 303/119.2 |
| 5,318,066 | * 6/1994 | Burgdorf et al. | 137/529 |
| 5,474,106 | * 12/1995 | Burgdorf et al. | |
| 5,476,313 | * 12/1995 | Lauer | 303/119.2 |
| 5,496,100 | * 3/1996 | Schmid | 303/119.2 |
| 5,639,061 | * 6/1997 | Krauter et al. | 303/119.2 |
| 5,669,675 | * 9/1997 | Mueller et al. | 303/119.2 |
| 5,673,980 | * 10/1997 | Schwarz et al. | 303/119.2 |
| 5,711,583 | * 1/1998 | Bareiss et al. | 303/119.2 |
| 5,810,330 | * 9/1998 | Eith et al. | 303/119.2 |
| 5,865,213 | * 2/1999 | Scheffal et al. | 303/119.2 |
| 5,879,060 | * 3/1999 | Megerle et al. | 303/119.2 |
| 6,086,164 | * 7/2000 | Oehler et al. | 303/119.2 |

FOREIGN PATENT DOCUMENTS

| | | | |
|---|---|---|---|
| 4028447 | * | 3/1992 | (DE) . |
| 4102626 | * | 8/1992 | (DE) . |
| 4142004 | * | 6/1993 | (DE) . |
| 4142005 | * | 6/1993 | (DE) . |
| 4234749 | * | 4/1994 | (DE) . |
| 19504246 | * | 8/1996 | (DE) . |

* cited by examiner

Primary Examiner—Douglas C. Butler
(74) Attorney, Agent, or Firm—Ronald E. Greigg; Edwin E. Greigg

(57) ABSTRACT

A barrier valve including an armature, longitudinally movable toward a pole core by excitation of an electrical winding. A prestressed compression spring in a longitudinal bore of the armature, as well as a support body, loaded by the compression spring, that is braced on a shoulder of the bore. The barrier valve furthermore has a tappet, which engages the support body and is movable relative to the armature and carries a closing body of a seat valve. When the winding is excited, the closing body is movable, overcoming the valve stroke, toward a valve seat of the seat valve. When the winding is excited, the closing body can be lifted from the valve seat by hydraulic forces acting on the closing body toward the valve seat, counter to the spring force of the compression spring in the armature. The stroke of the tappet relative to the armature engaging the pole core is limited to an amount less than the valve stroke. The barrier valve can be used in slip-controlled hydraulic brake systems and is distinguished by low noise when the pressure limiting function becomes operative.

5 Claims, 2 Drawing Sheets

BARRIER VALVE WITH PRESSURE LIMITING FUNCTION IN PARTICULAR FOR SLIP-CONTROLLED HYDRAULIC BRAKE SYSTEMS OF MOTOR VEHICLES

PRIOR ART

The invention is based on a barrier valve for slip-controlled hydraulic brake systems of motor vehicles.

A barrier valve of this type for hydraulic motor vehicle brake systems is already known (German Patent DE 40 41 506 C2), in which the tappet, from the closing position of the seat valve, plunges counter to the force of the compression spring into the armature if the response pressure for making the pressure limiting function operative is exceeded. If the hydraulic forces acting on the closing body of the seat valve decrease, then the tappet moves together with the closing body in the direction of the valve seat, because of the spring force of the compression spring in the armature, and is exposed to more or less sharply decreasing longitudinal vibrations in the flow cross section of the seat valve before closure of the seat valve occurs. This causes irritating flow noises.

ADVANTAGES OF THE INVENTION

The barrier valve according to the invention has the advantage over the prior art that because of the stroke limitation of the tappet in the pressure-limiting opening of the seat valve, an "excess stroke" of the tappet is avoided, and upon closure of the seat valve out of the pressure limiting function, the tappet is moved without vibration into the closing position. This might be ascribed to the fact that the stroke limitation of the tappet results in largely stable flow conditions at the closing body, which prevents longitudinal vibration from occurring when the hydraulic forces are lessening.

By the provisions recited, advantageous refinements of and improvements to the barrier valve defined herein are attained.

In terms of the function and structural design of the barrier valve, the provisions recited herein are highly advantageous, because of their simple design, their manufacture at favorable cost, and the assembly of the affected individual parts of the valve.

Since the tappet, with the interposition of the support body, cooperates functionally with the compression spring located inside the armature, the embodiment of the support body herein is advantageous, because as a result the tappet can be provided with a flat end face, which makes it less expensive to produce.

With the adaptation of the components of the barrier valve as recited herein, teaching is provided with which the above-described mode of operation for pressure limitation is assured.

BRIEF DESCRIPTION OF THE DRAWING

One exemplary embodiment of the invention is shown in simplified form in the drawings and described in further detail below.

DESCRIPTION OF THE EXEMPLARY EMBODIMENT

Figure 1:
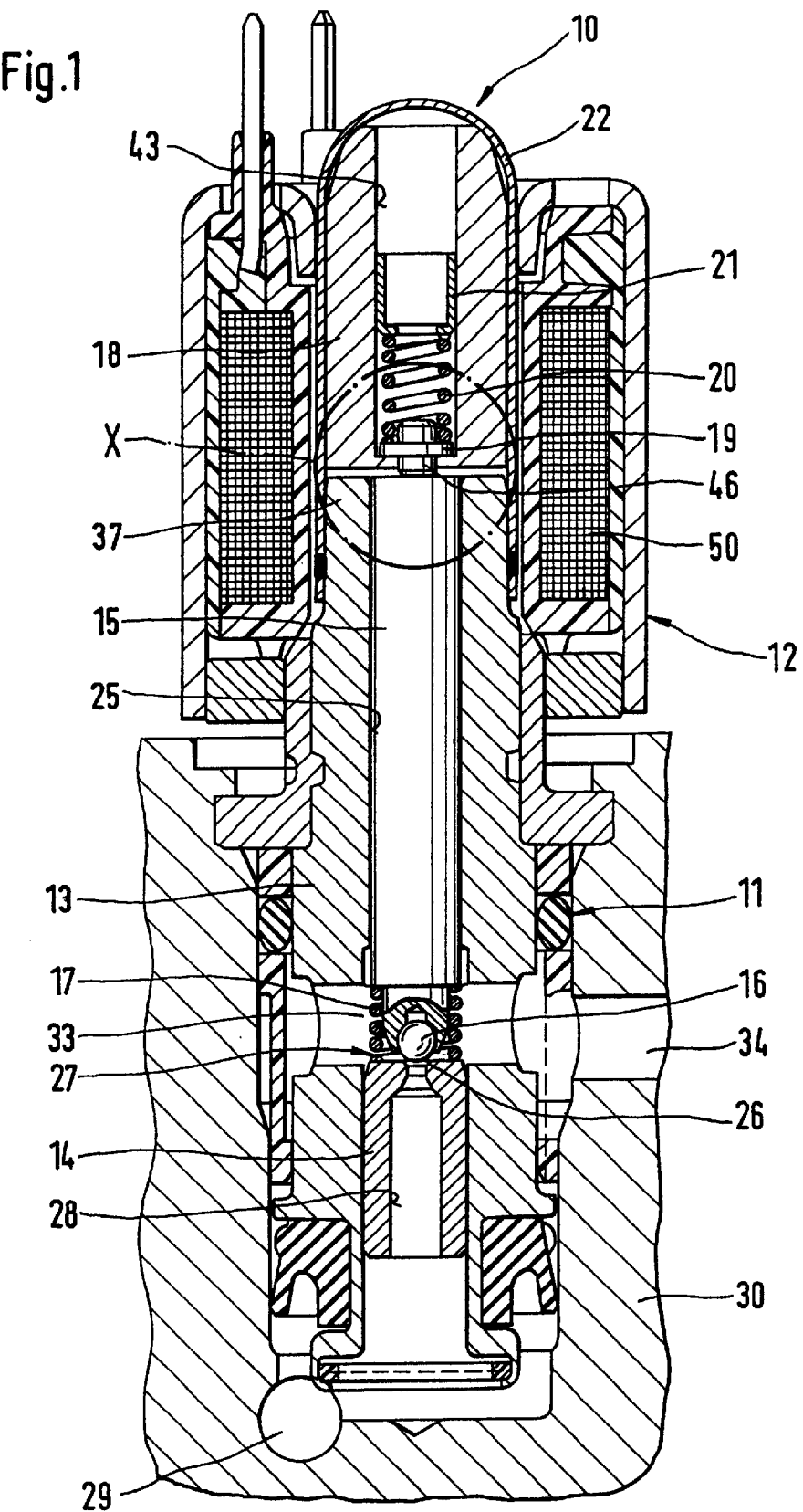
FIG. 1 is a longitudinal section through a barrier valve with a pressure limiting function.

A barrier valve with a pressure limiting function, shown at 10 in FIG. 1, comprises two component groups, a hydraulic group 11 and a magnet group 12. The hydraulic group 11 has essentially the following components: a valve housing 13 with a valve body 14, a tappet 15 with a closing body 16, a restoring spring 17, an armature 18 with a support body 19, a compression spring 20, and a press-fitted bush 21 and an armature guide sleeve 22.

The valve housing 13 has a continuous longitudinal bore 25, into which the valve body 14 is press-fitted, remote from the armature. The valve body 14 has a hollow-conical valve seat 26 associated with the closing body 16 of the armature 18. The closing body 16 and the valve seat 26 together form a seat valve 27 of the barrier valve 10, the seat valve being open when there is no electric current. Through a stepped bore 28 of the valve body 14, the valve seat 26 communicates with a pressure fluid line 29 of a valve block 30, in which the hydraulic group 11 is secured.

The ball-shaped closing body 16 is wedged into the conically tapering end portion of the tappet 15, on the side remote from the armature. Toward the closing body, a valve chamber 33 is formed in the valve housing 13, which chamber communicates with a pressure fluid line 34 of the valve block 30. Also located in the valve chamber 33 is the restoring spring 17, which on one end engages the valve body 14 and on the other engages the tappet 15 and keeps the seat valve 27 in its open position.

Figure 2:
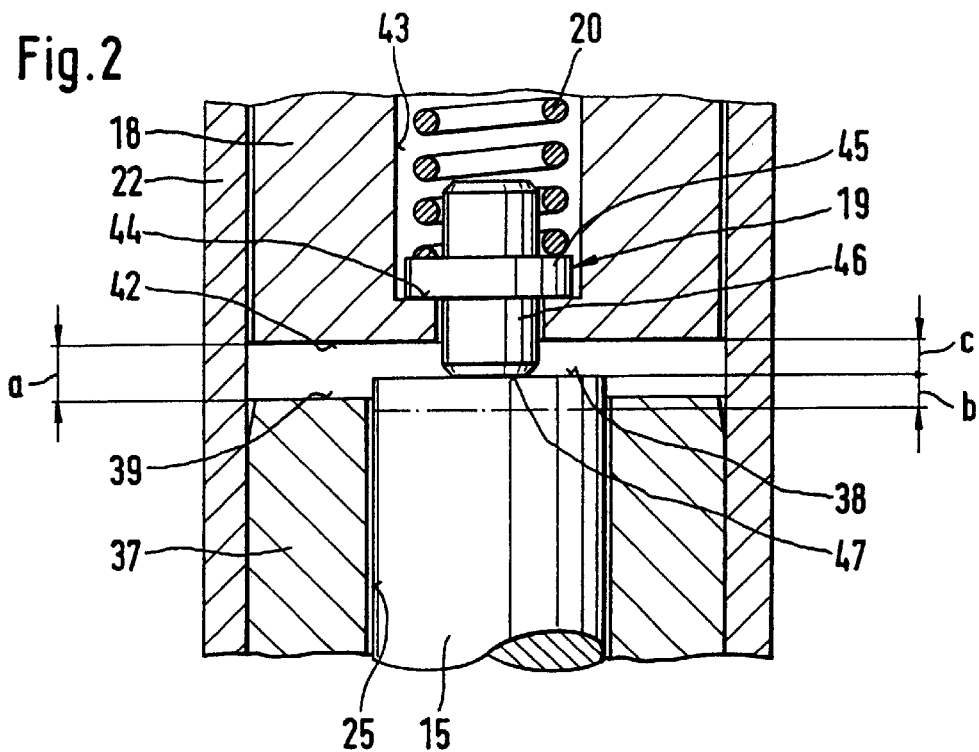
FIG. 2, in the form of a detail X of FIG. 1, shows a region of the barrier valve with the armature, pole core and tappet, on a larger scale.

Aside from its end portion toward the closing body, the tappet 15 has a uniform cross section of constant diameter. The tappet 15 is guided in the longitudinal bore 25 and extends into a portion of the valve housing 13 acting as a pole core 37, and with its end face 38, in the open position of the valve, it extends a certain amount past the tappet end face 39, toward the armature, of the pole core 37 (FIG. 2).

The armature guide sleeve 22, disposed coaxially with the valve housing 13 and the tappet 15, is slipped circumferentially onto the pole core 37 and tightly welded to the core. The armature 18 is disposed in the armature guide sleeve 22, and with an end face 42 toward the tappet or pole core the armature assumes a certain spacing from the end face 39 of the pole core 37. The armature 18 has a continuous longitudinal bore 43, with a shoulder 44 that is located toward the pole core and decreases the cross section of the longitudinal bore. The support body 19 received in the longitudinal bore 43 is braced on this shoulder 44 with a collar 45. The compression spring 20 also received in the longitudinal bore 43 of the armature engages the side of the support body collar 45 remote from the shoulder. The compression spring is prestressed by means of the bush 21 press-fitted into the longitudinal bore 43 of the armature. The support body 19 has a peg 46, which begins at its collar 45 and protrudes to a certain amount past the armature end face 42 and which with its end face 47 engages the end face 38 of the tappet 15.

The magnet group 12 surrounds the hydraulic group 11 in the region of the pole core 37 and the armature 18. The magnet group 12 has an electrical winding 50, with which, when it is supplied with current, a magnetic force aimed at the pole core 37 can be generated on the armature 18.

The barrier valve 10 with a pressure limiting function can be used in slip-controlled hydraulic brake systems of motor vehicles. One such brake system is partly shown in FIG. 1 of the German Patent DE 40 41 506 C2 mentioned at the outset. In such an application, the barrier valve 10 communicates via the pressure fluid line 34 with a master cylinder and via the pressure fluid line 29 with at least one wheel brake cylinder and a high-pressure pump of the brake system. When there is no current to the electrical winding 50 of the barrier valve 10, that is, when it is not excited, then as already noted the seat valve 27 assumes its open position, in which the pressure fluid lines 29 and 34 communicate hydraulically. When there is current to the electrical winding 50 or in other words it is excited, the seat valve 27 is moved into the valve closing position, in which the pressure fluid lines 29 and 34 are hydraulically disconnected. In the valve closing position, the barrier valve 10 is capable of performing a pressure limiting function. To that end, the tappet 15, armature 18, support body 19 and pole core 37 are adapted to one another in terms of their axial association as follows:

When the winding 50 is not excited, the aforementioned components, that is, the tappet 15, armature 18, support body 19 and pole core 37 of the barrier valve 10, assume the position shown in FIG. 2. Here the armature 18 is braced on the armature guide sleeve 22 in the region remote from the pole core, as a result of the spring force of the restoring spring 17, via the tappet 15, support body 19, compression spring 20, and press-fit bush 21. Since the prestressing of the compression spring 20 is very much greater than the force of the restoring spring 17, the support body collar 45 is in contact with the shoulder 45 of the longitudinal bore 43 of the armature in this position of the armature 18. In the process, the end face 42 of the armature 18 and the end face 39 of the pole core 37 assume a spacing from one another marked as the armature stroke a in FIG. 2.

Figure 3:
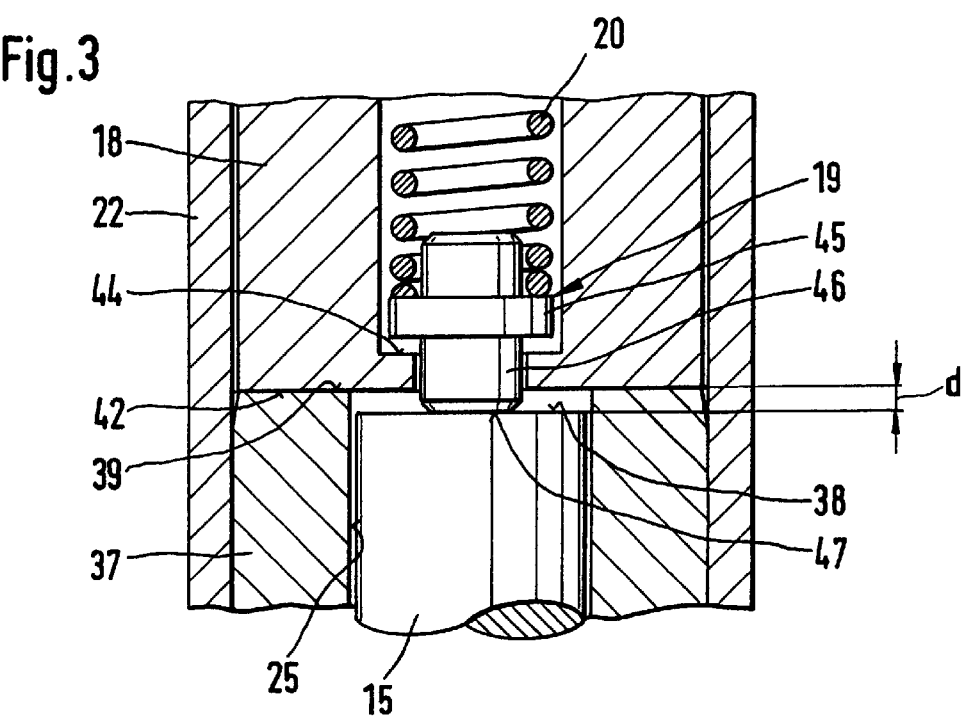
FIG. 3 shows the valve region of FIG. 2 with the armature engaging the pole core.

By excitation of the electrical winding 50, the armature 18 can be moved, by overcoming the armature stroke a, into the position shown in FIG. 3, in which the armature 18 is braced on the pole core 37. The armature stroke a is greater than the valve stroke b, that is, the stroke that the tappet 15 and closing body 16 execute, from the valve opening position, to reach the valve closing position in which the closing body 16 engages the valve seat 26. The attendant axial shift in position of the end face 38 of the tappet 15 is marked in dot-dashed lines in FIG. 2; FIG. 3 shows the position assumed by the tappet 15 toward the armature when the winding 50 is excited.

In the valve opening position, that is, when the winding 50 is not excited, the support body peg 46 protrudes with its end face 47 past the end face 42 of the armature 18 by an amount which is marked c in FIG. 2. The protrusion amount c is less than the armature stroke a. This stroke in turn is less than the sum of the valve stroke b and the protrusion amount c that exists when the winding 50 is not excited.

The protrusion amount c undergoes a reduction in the closing process of the seat valve 27, because during the motion of the armature 18 toward the pole core 37, after the valve stroke b has been overcome, the magnetic force acting on the armature overcomes the prestressing force of the compression spring 20, and the support body 19 is forced back into the armature from the tappet 15. The thus-reduced protrusion amount of the support body peg 46 is at the same time, given the engagement of the armature 18 with the pole core 37 as shown in FIG. 3, the limited tappet stroke d, by which the closing body 16 and the tappet 15 are movable out of the valve closing position counter to the force of the compression spring 20, in order to attain the pressure limiting function of the barrier valve 10. According to the invention, the stroke d of the tappet 15 relative to the armature 18 engaging the pole core 37 is reduced to an amount less than the valve stroke b.

The pressure limiting function of the barrier valve 10 is attained as follows:

In a traction control operation of the brake system, pressure fluid is pumped by the high-pressure pump at a pressure that is very much higher than the pressure prevailing in the valve chamber 33 when the seat valve 27 is closed. If the hydraulic force, acting toward the valve seat on the closing body 16 and engendered by the differential pressure, overcomes the contrary force generated by the prestressing force of the compression spring 20, then with reinforcement from the restoring spring 17 the tappet is forced back by the limited tappet stroke d until it meets a stop at the armature 18 and diverts pressure fluid from the pressure fluid line 29 to the pressure fluid line 34. An impermissibly great pressure increase in the high-pressure pump is thus avoided in the brake system. As the differential pressure decreases, the contrary force on the tappet 15 generated by the compression spring 20 toward the armature and returns the seat valve 27 to its closing position.

When the current supply to the electrical winding 50 is ended, the tappet 15, armature 18 and support body 19 return to their position shown in FIG. 2, in which the seat valve 27 assumes its open position.

In the exemplary embodiment described, the tappet 15, armature 18 and pole core 37 are provided, in a way that is 154 favorable from a production standpoint, with flat end faces 38, 42 and 39, respectively, that extend radially to their longitudinal axis. Since on the face end the tappet 15 has a larger diameter than the peg 46 of the support body 19, the end face 42 of the armature 18 serves as a stop for the tappet 15 in the pressure limiting function of the barrier valve 10. Instead of the support body peg 46 protruding past the end face 42 of the armature 18 toward the tappet, which peg is engaged in the exemplary embodiment by the tappet 15 with its end face 38, it is possible in a modification of the exemplary embodiment for the peg 46 to be formed onto the tappet 15. In this modification, it suffices for the support body 19 merely to be embodied as a disk corresponding to the support body collar 45, which is then engaged by the peg 46 united with the tappet 15.

The foregoing relates to a preferred exemplary embodiments of the invention, it being understood that other variants and embodiments thereof are possible within the spirit and scope of the invention, the latter being defined by the appended claims.

What is claimed is:

1. A barrier valve (10) with a pressure-limiting function for slip-controlled hydraulic brake systems of motor vehicles, comprising an armature (18) longitudinally movable counter to a pole core (37) by excitation of an electrical winding (50), a prestressed compression spring (20) in a longitudinal bore (43) of the armature (18), a support body (19), loaded by the compression spring (20), that is braced on a shoulder (44) of the longitudinal bore (43) of the armature, a tappet (15), guided longitudinally in the pole core (37) which engages the support body (19), remote from the armature, the tappet has a closing body (16) of a seat valve (27) and the tappet is movable relative to the armature (18), a valve seat (26) of a seat valve (27), when the winding (50) is excited, the closing body (16) is movable by indirect engagement of the armature (18) with the tappet (15) toward the valve seat while overcoming a valve stroke (b), and when the winding (50) is excited the closing body (16) is lifted from the valve seat, by hydraulic forces acting on the closing body toward the valve seat, counter to a spring force of the compression spring (20) in the armature (18), a stroke (d) of the tappet (15) relative to the armature (18) that engages the pole core (37) is limited, as a result of hydraulic forces acting on the closing body (16), to an amount less than a valve stroke (b).

2. The barrier valve of claim 1, in which the stroke (d) of the tappet (15) is limited by a stop on the armature (18).

3. The barrier valve of claim 2, in which the stop is an end face (42), toward the tappet, of the armature (18).

4. The barrier valve of claim 3, in which the support body (19) has a peg (46), that protrudes past the end face (42), toward the tappet, of the armature (18), in which the peg is engaged by the tappet (15) with an end face (38).

5. The barrier valve of claim 4, in which the stroke (a) of the armature (18) toward the pole core (37) is less than a sum of the valve stroke (b) and a protrusion amount (c), existing when the winding (50) is not excited, of the support body peg (46) beyond the armature end face (42) on the side toward the tappet.

* * * * *